(12) United States Patent
Nichols

(10) Patent No.: US 8,460,634 B2
(45) Date of Patent: Jun. 11, 2013

(54) SYSTEM AND METHOD FOR EXTRACTING AND COLLECTING SUBSTANCES FROM A MOLECULAR COMBINATION

(75) Inventor: Timothy O. Nichols, Coppell, TX (US)

(73) Assignee: Elementary Energy, Inc., Coppell, TX (US)

( * ) Notice: Subject to any disclaimer, the term of this patent is extended or adjusted under 35 U.S.C. 154(b) by 0 days.

(21) Appl. No.: 13/363,868

(22) Filed: Feb. 1, 2012

(65) Prior Publication Data

US 2012/0128578 A1 May 24, 2012

Related U.S. Application Data

(63) Continuation of application No. 11/459,546, filed on Jul. 24, 2006, now Pat. No. 8,110,175.

(51) Int. Cl.
*C01B 3/00* (2006.01)
*C01B 3/50* (2006.01)
*H01J 49/30* (2006.01)

(52) U.S. Cl.
USPC .............. 423/658.2; 423/658.3; 250/298

(58) Field of Classification Search
USPC ................................... 423/658.2
See application file for complete search history.

(56) References Cited

U.S. PATENT DOCUMENTS

| | | | |
|---|---|---|---|
| 3,496,092 A | 2/1970 | Fraser | |
| 4,095,118 A | 6/1978 | Rathbun | |
| 4,233,127 A | 11/1980 | Monahan | |
| 4,419,329 A | 12/1983 | Heller | |
| 4,682,564 A | 7/1987 | Cann | |
| 4,851,722 A | 7/1989 | Zauderer | |
| 5,254,934 A | 10/1993 | Carabetta et al. | |
| 5,260,640 A | 11/1993 | Carabetta et al. | |
| 6,128,174 A | 10/2000 | Ritter et al. | |
| 6,583,407 B1 | 6/2003 | Fischer et al. | |
| 6,726,893 B2 | 4/2004 | Lee et al. | |
| 6,768,109 B1 | 7/2004 | Brokaw et al. | |
| 6,939,449 B2 | 9/2005 | Streckert et al. | |
| 2004/0031759 A1 | 2/2004 | Richard | |

OTHER PUBLICATIONS

Supplementary European Search Report; Application No. 07799692. 4-2111 / 2049224; PCT/US2007073836; 7 pages, Mar. 6, 2012
"MHD Plasma Stability/Flow Separation Control," *Ohio State Mechanical Engineering Research Laboratories*, Internet @http:// rclsgi.eng.ohio-state.edu/~adamovic/netl/mhd_sep_control.html, Dated Unknown, 2 pages.

(Continued)

*Primary Examiner* — Melvin C Mayes
*Assistant Examiner* — Kenneth Vaden
(74) *Attorney, Agent, or Firm* — Baker Botts L.L.P.

(57) ABSTRACT

A system and process are provided for extracting a substance from a molecular combination. The process comprises heating the molecular combination to dissociate the molecular combination into cations and anions, moving the cations and anions through a magnetic field to separate cations and anions, and isolating cations from anions with a barrier. The system comprises a non-conductive conduit for guiding an ionized particle stream, a magnetic field source for creating a magnetic field through which the ionized particle stream moves, and a barrier located in the conduit. The ionized particle stream has a velocity relative to the conduit, and the magnetic field source is oriented relative to the velocity of the ionized particle stream so that cations are separated from anions as the ionized particle stream moves through the magnetic field. The barrier is oriented in the conduit so that cations are isolated from anions after separation.

2 Claims, 2 Drawing Sheets

OTHER PUBLICATIONS

"MHD Boundary Layer Transition Control," *Ohio State Mechanical Engineering Research Laboratories*, Internet @http://rclsgi.eng.ohio-state.edu/~adamovic/netl/mhd_bl_controlhtml, Date Unknown, 3 pages.

W. R. Pyle et al., "Direct Solar-Thermal Hydrogen Production from Water Using Nozzle/Skimmer and Glow Discharge," *H-Ion Solar Inc.*, Internet @ http://www.hionsolar.com/n-hion96.htm, Date Unknown, 16 pages.

M. Mitchner et al., *Partially Ionized Gases*, Mechanical Engineering Department, Stanford University, Chapter IV, Section 9, *Magnetohydrodynamic (MHD) Power Generation*, Internet @http://navier.stanford.edu/PIG/C4_S9.pdf, 1973, pp. 214-230.

Lewandowski et al., "High Temperature Solar Splitting of Methane to Hydrogen and Carbon" Presentation at Hydrogen and Fuel Cells Merit Review Meeting, May 19-22, 2003, 32 pages.

*Notification of Transmittal of the International Search Report and the Written Opinion of the International Searching Authority* for International Application No. PCT/US 07/73836; 11 pages, Dec. 6, 2007.

Australian Office Action; issued Mar. 10, 2010; Patent Application No. 2008/276867; 4 pages.

People's Republic of China First Office Action; issued Nov. 12, 2010; Patent Application No. 2007/80028280.5; 12 pages. Citing Chinese version (10 pp), but also attaching the English translation (12 pages).

Canadian Intellectual Property Office Office Action; issued Mar. 9, 2011; Patent Application No. 2,657,907, 2 pages.

People's Republic of China Intellectual Property Office Second Office Action; issued Jun. 22, 2011; Patent Application No. 200780028280.5, 4 pages.

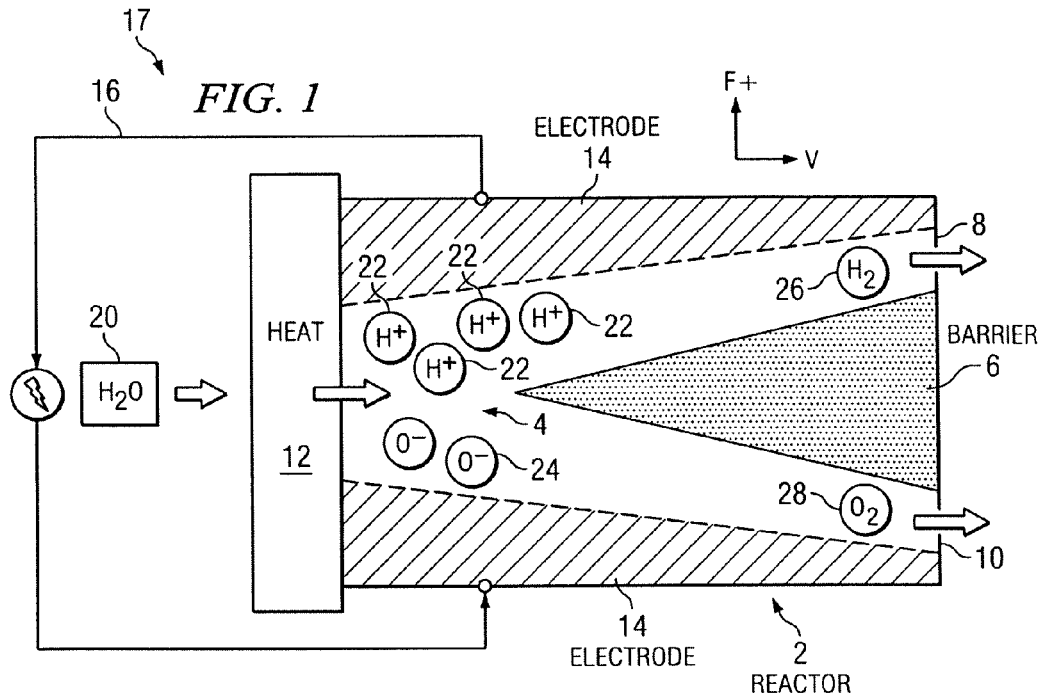
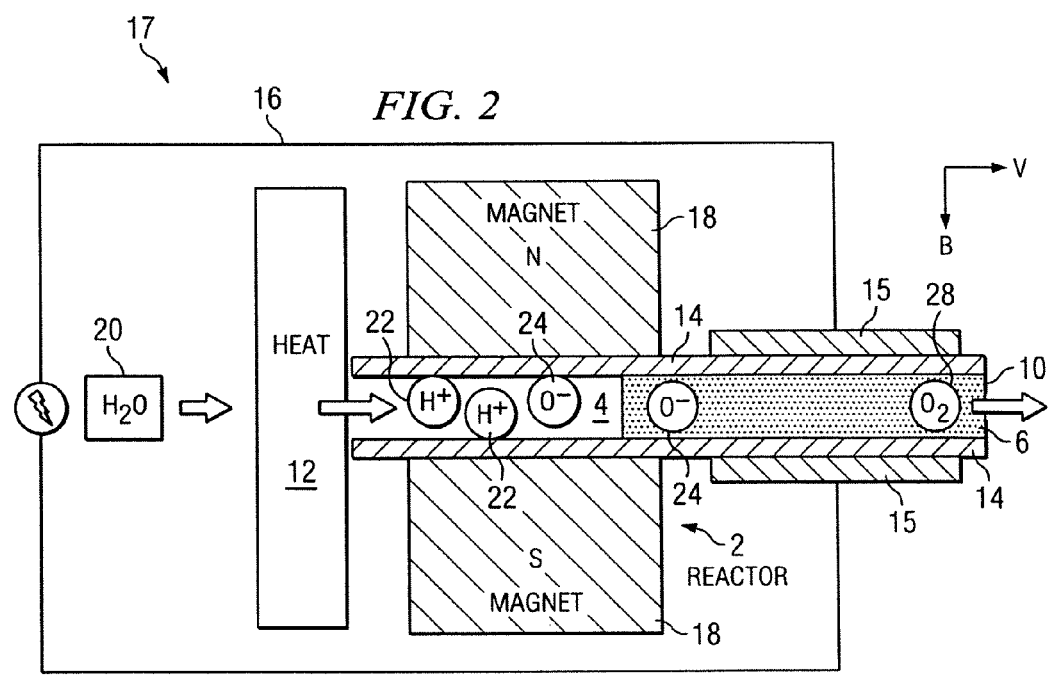

SYSTEM AND METHOD FOR EXTRACTING AND COLLECTING SUBSTANCES FROM A MOLECULAR COMBINATION

RELATED APPLICATIONS

This application is a continuation of U.S. application Ser. No. 11/459,546 filed Jul. 24, 2006 entitled "System and Method for Extracting and Collecting Substances From a Molecular Combination," now U.S. Pat. No. 8,110,175.

TECHNICAL FIELD

This invention relates in general to energy production, and more particularly, to a system and process for extracting and collecting substances from a molecular combination.

BACKGROUND

The worldwide demand for energy continues to increase at a rapid pace, while concern about the stability of fossil fuel supplies also continues to grow. Consequently, both the cost of fossil fuels and the push for alternative fuels also have increased dramatically. The push for alternative fuels, though, is also partially driven by growing concerns over the environmental impact of burning fossil fuels to produce energy.

Hydrogen and hydrogen-powered fuel cells are widely viewed as a promising source of clean, reliable energy. According to some estimates, the potential market value for fuel cells is more than $100 billion. Currently, though, hydrogen-based technologies are still in their infancy. The cost of making fuel cells is still high, as is the cost of hydrogen production. Moreover, most current hydrogen production processes themselves have unfavorable environmental consequences.

Accordingly, there is a need for improved systems and processes for producing hydrogen and other fuels.

SUMMARY

In accordance with the present invention, disadvantages and problems associated with the complexity and environmental impact of energy production have been substantially reduced or eliminated.

In accordance with one embodiment of the invention, a process is provided for extracting a substance from a molecular combination. The process comprises heating the molecular combination to dissociate the molecular combination into cations and anions, moving the cations and anions through a magnetic field to separate the cations and the anions, and isolating the cations from the anions with a barrier.

In accordance with another embodiment of the present invention, a system is provided for extracting a substance from a molecular combination of atoms. The system comprises a non-conductive conduit for guiding an ionized particle stream having cations and anions, a magnetic field source for creating a magnetic field through which the ionized particle stream moves, and a barrier located in the conduit. The ionized particle stream has a velocity relative to the conduit, and the magnetic field source is oriented relative to the velocity of the ionized particle stream so that cations are separated from anions as the ionized particle stream moves through the magnetic field. The barrier is oriented in the conduit so that cations are isolated from anions after separation.

Various embodiments of the invention provide important advantages over known systems and processes. For example, certain embodiments may be used to provide an efficient means for extracting hydrogen. Moreover, these embodiments have few, if any, moving parts. Accordingly, they provide a very reliable and cost effective operation.

Certain embodiments also significantly reduce or eliminate the environmental costs associated with many known hydrogen production means.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 is a simplified block diagram that illustrates a top view cross-section of one embodiment of the invention;

FIG. 2 is a simplified block diagram that illustrates a side view cross-section of the system of FIG. 1;

DETAILED DESCRIPTION

Figure 3:
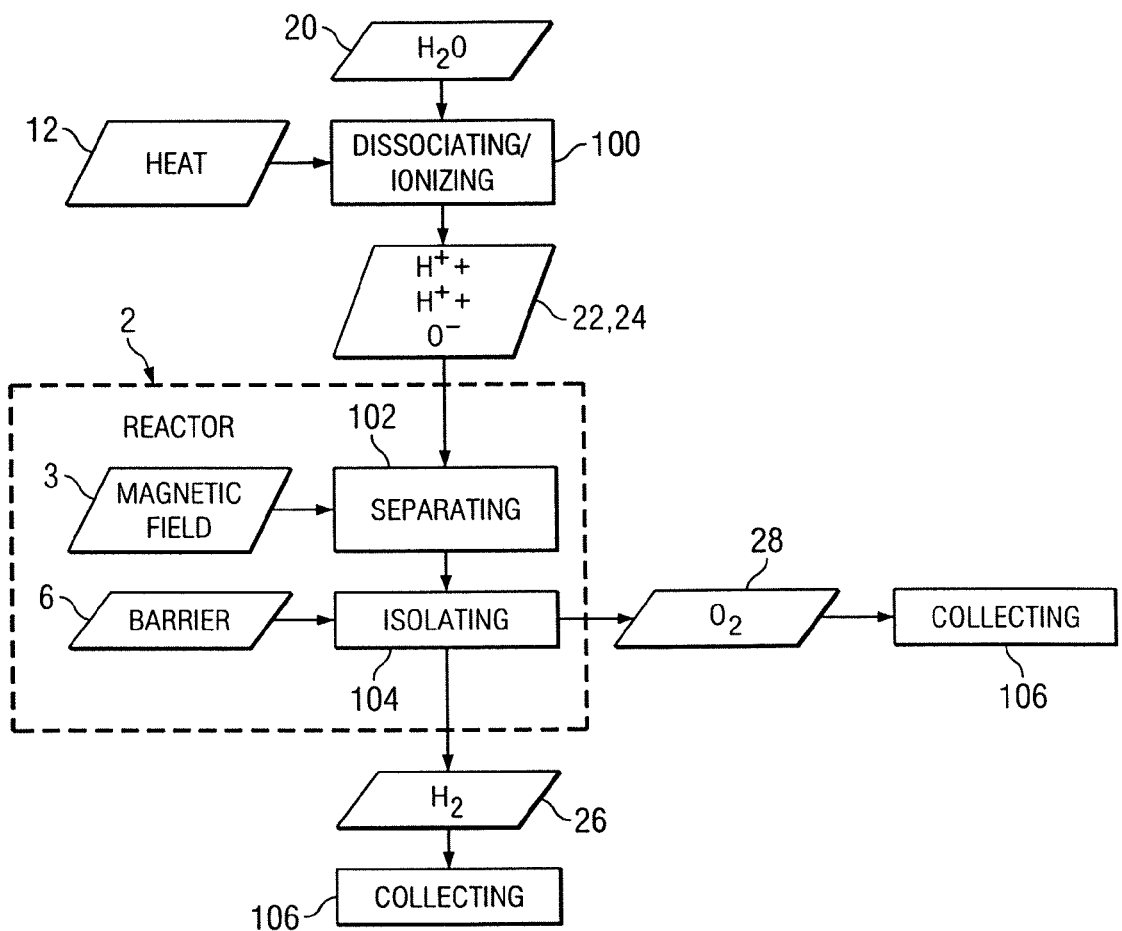
FIG. 3 is a flow diagram illustrating a process embodiment of the invention.

FIG. 1 is a simplified block diagram that illustrates a top view cross-section of one embodiment of a system for extracting ionized particles from a molecular combination. In such an embodiment, a reactor 2 comprises a conduit 4, a barrier 6, and exhaust ports 8 and 10. As FIG. 1 illustrates, reactor 2 also may be coupled to a heat source 12, electrodes 14, and cooling system 15. A conductor 16 typically connects electrodes 14. A system comprising a reactor 2 and a heat source 12 is referred to herein generally as a generator system 17. Generator system 17 may further include optional components such as electrodes 14, cooling system 15, and conductor 16.

Conduit 4 is generally comprised of an electrically insulated (non-conductive) material capable of maintaining structural integrity at temperatures generally between 3000 F and 14,000 F, or higher for certain applications. Examples of material suitable for conduit 4 include, without limitation, fused quartz, high-temperature ceramics, and glass.

Likewise, barrier 6 generally is a physical barrier comprised of a non-conductive material capable of maintaining structural integrity at high temperatures. As FIG. 1 illustrates, such a physical embodiment may have a triangular cross-section, oriented such that the apex is upstream of the base. Examples of material suitable for barrier 6 include, without limitation, fused quartz, high-temperature ceramics, and glass.

Heat source 12 represents any source or system having sufficient heating capability to dissociate the operative molecular combination (e.g., approximately 3000 F for water). Heat source 12 may comprise, without limitation, a solar-powered heat source, an electric arc, or nuclear heat source.

Conductor 16 represents any electrically conductive material that provides a current path between electrodes 14. Conductor 16 may be metallic or non-metallic. Examples of suitable metallic conductors include, without limitation, wires comprised of copper, silver, or gold.

Cooling system 15 represents any passive or active system or apparatus for cooling or refrigeration. Examples of suitable structures for cooling include, without limitation, water jackets, dry ice, alcohol, and peltier devices. Similar cooling systems may be coupled to conduit 4 and barrier 6 for cooling during operation.

FIG. 2 is a simplified block diagram that illustrates a side view cross-section of the system of FIG. 1. As FIG. 2 illustrates, opposing magnets 18 are placed in proximity to conduit 4 to create a magnetic field B across conduit 4.

Magnets 18 represent any type of permanent magnet or electromagnet. Examples of permanent magnets that are suitable for operation in reactor 2 include rare earth magnets, which include neodymium magnets. Magnets 18 may produce a static or dynamic magnetic field B across conduit 4. Examples of suitable dynamic fields include, without limitation, any rotating (sinusoidal), synchronized, or pulsed magnetic field.

In operation, a stream of molecules 20 moves through heat source 12, where it is dissociated into ionized particles and exits heat source 8 as a stream of cations (positively charged ions) and anions 24 (negatively charged ions) having a velocity V relative to conduit 4. According to well-known principles of magnetohydrodynamics (MHD), the ionized particles will experience an induced electric field that is perpendicular to the magnetic field. The induced electric field imparts a force F on each ionized particle. Accordingly, cations 22 and anions 24 are separated as the ionized particle stream moves through the magnetic field and the induced electric field deflects cations 22 and anions 24 in opposite directions. Barrier 6 is positioned in conduit 4 sufficiently far downstream to isolate cations 22 and anions 24 in separate channels after separating them in the magnetic field.

In one embodiment, electrodes 14 and conductor 16 provide a means for dissipating charges from the ionized particles. Dissipating charge after separating and isolating the ionized particles discourages particles from attracting each other and moving upstream once they have been isolated, thereby enhancing the performance of the reactor. Moreover, such an embodiment is capable of generating an electric current as a by-product of the extraction process.

After isolating cations 22 and anions 24, the particles may be cooled to recombine the particles into neutral atoms and molecular combinations, such as particles 26 and 28. This cooling may be passive, allowing the particles to dissipate heat naturally as they move away from the effects of heat source 12, or the cooling may be active, accelerating the cooling process through external influences. Particles 26 and 28 may then be collected in separate cooling and compression units well-known in the art, as they exit their respective exhaust ports.

FIGS. 1 and 2 illustrate the operation of the system on the molecular combination commonly known as water. Water, of course, is comprised of two hydrogen atoms and an oxygen atom. Thus, in such an operation, heat source 12 dissociates the water molecules into hydrogen cations 22 and oxygen anions 24. The dissociated ionized particles are then separated as they pass through the magnetic field B. More particularly, the induced positive electric force F+ deflects the hydrogen cations 22 towards one wall of conduit 4, while the negative electric force F− deflects the oxygen anions towards the opposite wall of conduit 4. Barrier 6 then isolates hydrogen cations 22 from the oxygen anions as they continue to move through conduit 4, thereby preventing the hydrogen and oxygen from recombining. The hydrogen cations 22 cool as they continue moving towards exhaust port 8. As the hydrogen cations 22 cool, they recombine to form diatomic hydrogen molecules 26. Likewise, oxygen anions 24 also cool as they continue moving towards exhaust port 10, isolated from hydrogen cations 22, and form diatomic oxygen molecules 28. Consequently, hydrogen molecules 26 and oxygen molecules 28 may be collected separately as each exits conduit 4 through exhaust ports 8 and 10, respectively.

Although FIGS. 1 and 2 demonstrate operation of an embodiment of the invention in conjunction with water, the principles of the system may be applied broadly to a variety of input compositions. Such input compositions may be varied to alter the composition of particles 26 and 28, or to produce additional substances. For example, molecular combinations that include carbon atoms may be used in conjunction with other substances having hydrogen (including water) to produce hydrocarbons. In one particular example, water may be combined with carbon dioxide. The heat source then dissociates the substance into hydrogen cations, carbon cations, and oxygen anions. The result is a stream of diatomic hydrogen particles and methane gas emerging from exhaust port 8, and oxygen from exhaust port 10. The stream may be collected and filtered as desired, using structures and processes that are well-known in the art.

FIG. 3 is a flow diagram illustrating a process embodiment of the invention. As in FIGS. 1 and 2, this process is depicted with reference to water as the operative molecular combination, but the principles described are applicable to a wide variety of molecular combinations. In particular, the process contemplates operation in conjunction with molecular combinations that include hydrogen atoms, carbon atoms, or both. An example of such a combination includes, without limitation, carbonic acid (a solution of carbon dioxide in water).

Referring to FIG. 3 for illustration, heat source is applied to molecular combination 20, which dissociates molecular combination (step 100). The resulting stream of hydrogen cations 22 and oxygen anions continues to move through conduit 4 with a velocity V. Magnetic field B then is applied to the stream of hydrogen cations 22 and oxygen anions 24 as it moves through conduit 4. Magnetic field B in turn induces an electric field that separates cations 22 from anions 24 (step 102). More specifically, the electric field imparts a force F that pushes cations 22 and anions 24 in opposite directions within conduit 4. As the stream continues to move through conduit 4, the separated cations 22 and anions 24 move past barrier 6. Barrier 6 represents any structure or system operable to prevent cations 22 and anions 24 from recombining into molecular combination 20 after the streams are separated, as illustrated in FIG. 1. Thus, barrier 6 effectively isolates hydrogen cations 22 from oxygen anions 24 into separate particle streams after separation (step 104). As the separate particle streams cool (either as the result of passive or active cooling), hydrogen cations 22 combine into diatomic hydrogen particles 26 and oxygen anions 24 combine to form diatomic oxygen particles 28. Hydrogen particles 26 and oxygen particles 28 then are collected separately (step 106) for subsequent storage, transport, or further processing.

Figure 4:
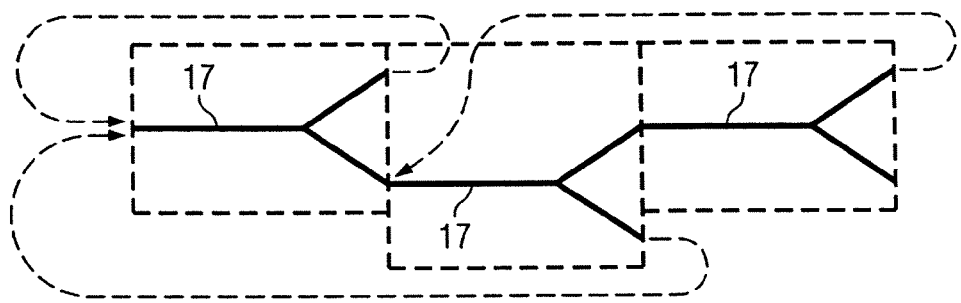
FIG. 4 is a simple block diagram that illustrates an alternative embodiment of the invention in which reactors are combined.

FIG. 4 is a simple block diagram that illustrates an alternative embodiment of the invention in which reactors are combined to expand the system and/or refine the process. For example, two or more reactors 2 may be connected in series so that streams from one or both exhaust ports of a first system feed directly into the conduit of a second system. Alternatively, one such stream may be recycled and redirected to feed into the first system or an intermediate system as part of the operative molecular combination.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for extracting a substance from a molecular combination, the system comprising:
- a first reactor system coupled in series to a second reactor system;
- wherein each reactor system comprises a non-conductive conduit for guiding an ionized particle stream having cations and anions, the ionized particle stream having a velocity relative to the conduit; a magnetic field source for creating a magnetic field through which the ionized particle stream moves, the magnetic field source oriented relative to the velocity of the ionized particle stream so that cations are separated from anions as the ionized particle stream moves through the magnetic field; a barrier located in the conduit so that cations are isolated from anions after separation; and a cooling system coupled to the conduit for cooling cations and anions to form a first and second molecular combination after the cations are isolated from the anions; and
- wherein the first molecular combination of the first reactor system is directed into the conduit of the second reactor system.

2. The system of claim 1, wherein the second molecular combination is directed into the conduit of the first reactor system.

* * * * *